US006458860B1

(12) United States Patent
Humbert et al.

(10) Patent No.: US 6,458,860 B1
(45) Date of Patent: Oct. 1, 2002

(54) ADVANCES IN URETHANE FOAM CATALYSIS

(75) Inventors: Heiko H. Humbert, Hamburg (DE); Robert Allison Grigsby, Jr., Austin, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 0 days.

(21) Appl. No.: 10/038,462

(22) Filed: Jan. 7, 2002

Related U.S. Application Data

(60) Provisional application No. 60/295,132, filed on Jun. 1, 2001.

(51) Int. Cl.[7] .............................. C08G 18/16; C08J 9/08; C07C 233/05; B01J 31/00
(52) U.S. Cl. ................. 521/115; 502/167; 502/200; 521/116; 521/117; 521/118; 521/128; 521/129; 521/159; 521/163; 521/164; 521/167; 521/170; 564/215; 564/503; 564/506; 564/508
(58) Field of Search .................... 564/215, 503, 564/506, 508; 502/167, 200; 521/115, 116, 117, 118, 128, 129, 159, 163, 164, 167, 170

(56) References Cited

U.S. PATENT DOCUMENTS

| 6,153,659 A | * | 11/2000 | Carr et al. ................. 521/115 |
| 6,380,274 B1 | * | 4/2002 | Chen et al. ................ 512/115 |
| 6,387,972 B1 | * | 5/2002 | Ghobary et al. ............ 521/115 |

FOREIGN PATENT DOCUMENTS

| WO |  | 9312153 | * | 6/1993 |
| WO | WO 01/02459 |  | 7/1999 |

* cited by examiner

Primary Examiner—Shailendra Kumar
(74) Attorney, Agent, or Firm—Russ R. Stolle; Ron D. Brown; Christopher J. Whewell

(57) ABSTRACT

Provided herein are catalyst systems useful for providing polyurethane foam products which exhibit low fogging characteristics while possessing favorable overall physical properties when used as interior components of automobiles and other motorized vehicles.

17 Claims, No Drawings

ADVANCES IN URETHANE FOAM CATALYSIS

CROSS-REFERENCE TO RELATED APPLICATIONS

This Application claims priority to U.S. patent application Ser. No. 60/295,132, filed Jun. 1, 2001, which is currently still pending.

FIELD OF THE INVENTION

This invention relates to amine catalysts useful in producing polyurethane foam products. More particularly, it relates to amine catalysts useful for producing polyurethane foam products which have low volatility. The low-volatility catalysts of the invention provide for the manufacture of polyurethane foam products useful as automotive interior components which do not emit vapors over time or under the effects of heat which would otherwise cause nuisance fogging of windshields, and also reduce the chemical content of the air inside vehicles to which a driver or passengers are otherwise exposed to.

BACKGROUND

The prior art is replete with catalyst systems useful in producing polyurethane foam products which may be used in the interior of automobiles. However, the catalysts used in polyurethane systems of prior art contain volatile amines which may exude out of the foam product and cause fogging on the windshield inside of a car or other vehicle, in addition to exposing the occupants of such vehicles to these amines.

World Patent Application WO 01/02459 attempts to alleviate such problems by providing reactive imidazoles with reactive hydroxyl compounds for producing foams with low fogging characteristics.

SUMMARY OF THE INVENTION

The present invention provides a catalyst system useful in producing a polyurethane foam product which comprises:

a) a first catalyst defined by the structure:

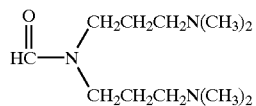

and b) a second catalyst described by the structure:

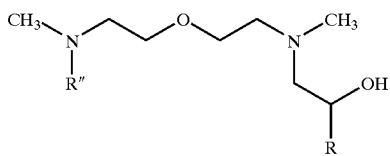

in which R is hydrogen or any alkyl group having between 1 and 10 carbon atoms, straight-chain or branched; and R" is methyl or:

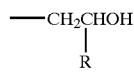

DETAILED DESCRIPTION

The present invention is concerned with the use of a catalyst system comprising N,N-bis-(3-dimethylaminopropyl) formamide as a component, which is represented by the chemical structure:

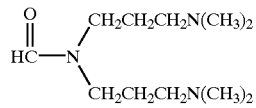

in combination with one or more other catalytic materials which catalyze the reaction between an isocyanate group and a hydroxy group, wherein the hydroxy group is attached to a carbon atom backbone such as in a polyol, or water. The other catalytic materials are often referred to as "blowing" catalysts by those skilled in the art, because they catalyze the reaction between an isocyanate group and water.

The catalyst component N,N-bis-(3-dimethylaminopropyl) formamide according to the invention is considered a non-reactive catalyst since it is not consumed during the curing of the polyurethane.

Thus, a catalyst system useful in producing a polyurethane foam product according to in one aspect of the invention comprises:

a) a first catalyst defined by the structure:

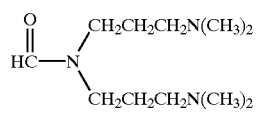

and b) a second catalyst described by the structure:

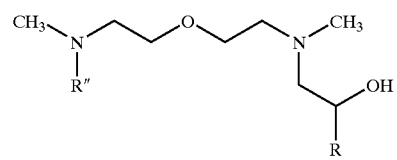

in which R is hydrogen or any alkyl group having between 1 and 10 carbon atoms, straight-chain or branched; and R" is methyl or:

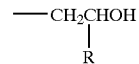

The use of the non-reactive catalyst of the invention in combination with a reactive catalyst prevents fogging from occurring. Normally, in the use of a reactive catalyst, some detrimental effects are seen on the physical properties of the resultant foam. According to the present invention, a catalyst system is provided that has a low vapor pressure, is not very volatile, is not completely reactive, and provides a foam with good physical properties.

Reactive catalyst components useful as components in producing a foam according to the invention include, without limitation: JEFFCAT® DMEA, JEFFCAT® ZR-70, JEFFCAT® Z-110, JEFFCAT® ZF-10, dimethylaminopropylurea, bis(dimethylaminopropyl)urea, or any material that is known to those skilled in the art as being capable of functioning as a blowing or gelling catalyst in a polyurethane system which contains three heteroatoms or active sights with two carbon spacing which is consumed during the formation of the foam.

Non-reactive catalyst components useful as components in producing a foam according to the invention include, without limitation: JEFFCAT® TAP, JEFFCAT® ZF-22, JEFFCAT® DD, tetramethylbutanediammine, dimorpholinodiethylether, JEFFCAT®MEM, JEFFCAT®MEM DM-70, JEFFCAT®MEM bis (dimethylaminoethoxy)ethane, JEFFCAT® NMM, JEFFCAT® NEM, JEFFCAT® PM, JEFFCAT® M-75, JEFFCAT® MM-20, JEFFCAT® MM-27, JEFFCAT® DM-22, Pentamethydiethylenetriamine, Tetramethylethylenediammine, Tertamethylaminopropylamide, 3-dimethylamino-N,N-dimethylpropylamide, or any material that is known to those skilled in the art as being capable of functioning as a blowing or gelling catalyst in a polyurethane system which contains three heteroatoms or active sights with two carbon spacing which is not consumed during the formation of the foam. (JEFFCAT® is a registered trademark of Huntsman Petrochemical Corporation of Austin, Tex.) All of the foregoing JEFFCAT® trademarked materials are available from Huntsman Petrochemical Corporation, 7114 North Lamar Boulevard, Austin, Tex.

Polyols useful in providing a polyurethane foam according to the present invention include polyetherpolyol, polymer polyols, and polyesterpolyols having 2 or more reactive hydroxyl groups. Polyetherpolyols include, for example, polyhydric alcohols such as glycol, glycerin, pentaerythritol, and sucrose; aliphatic amine compounds such as ammonia, and ethyleneamine; aromatic amine compounds such as toluene diamine, and diphenylmethane-4,4'-diamine; and/or a polyetherpolyol obtained by adding ethylene oxide or propylene oxide to a mixture of above-mentioned compounds. Polymer polyol is exemplified by a reaction product of said polyetherpolyol with ethylenic unsaturated monomer, such as butadiene, acrylonitrile, and styrene, the reaction being conducted in the presence of a radical polymerization catalyst. Polyesterpolyols include those which are produced from a dibasic acid and a polyhydric alcohol such as, for example, polyethyleneadipate and polyethyleneterephthalates which may include those products reclaimed from waste materials.

As for the isocyanate or polyisocyanate component, known organic isocyanates or polyisocyanates may be employed including, for example, aromatic polyisocyanates such as toluenediisocyanate, diphenylmethane-4,4'-diisocyanate, and positional isomers thereof, polymerized isocyanate thereof, and the like; aliphatic polyisocyanates such as hexamethylenediisocyanate and the like; alicyclic polyisocyanates such a isophoronediisocyanate and the like; pre-polymers with end isocyanate groups such as toluenediisocyanate pre-polymer and diphenylmethane-4,4'-diisocyanate pre-polymer which are obtained by the reaction of the above-mentioned substances with a polyol; denatured isocyanate such as carbodiimide denatured substances; and further mixed polyisocyanates thereof.

Blowing agents useful in accordance with the present invention are exemplified by low boiling point hydrocarbons, halogenated hydrocarbons, carbon dioxide, acetone, and/or water. Known halogenated methanes and halogenated ethanes may be used as halogenated hydrocarbons. Among them, preferably are chlorofluorocarbon compounds such as trichloromonofluoromethane (R-11), dichlorotrifluoroethane (R-123), dichloromonofluoroethane (R-141b), and the like. The amount of the foaming agent to be used is not particularly limited, but the amount of chlorofluorocarbon to be used is usually not larger than 35 parts by weight, preferably 0 to 30 parts by weight, based on 100 parts of polyol, and the amount of water to be used is not less than 2.0 parts, preferably 3.0 to 20.0 parts. The stabilizer is selected, for example, from non-ionic surfactants such as organopolysiloxanepolyoxyalkylene copolymers, silicone-glycol copolymers, and the like, or a mixture thereof. The amount of the stabilizer is not particularly specified, but usually 0 to 2.5 parts by weight based on 100 parts by weight of polyol.

According to the present invention, other auxiliary agents may be added if necessary. They include flame retardants, coloring agents, fillers, oxidation-inhibitors, ultraviolet ray screening agents, and the like known to those skilled in the art.

The polyurethane prepared by use of the amine catalyst of the present invention includes flexible foam, HR foam, semi-rigid foam, rigid foam, microcellular foam, elastomer, and the like which are prepared by the conventional known one-shot method, the pre-polymer method, and the like. Among these known processes, particularly preferable is the process for producing polyurethane foam by using a foaming agent which is processed in a combined form such as foil, coating, or border material, or by molding integratedly, with other materials. Said other materials referred to above include resins such as polyvinylchloride resin, ABS resin, polycarbonate resin, and the like, metals, glasses, and the like. Examples of applications of the product include interior articles of automobiles such as instrument panels, seats, head rests, arm rests, and door panels as well as packaging materials, and the like.

The amount of the amine catalyst used in a composition from which a foam may be produced in accordance with the present invention is in the range of from 0.02 to 10 parts, more preferably 0.1 to 5 parts, by weight based on 100 parts of the polyol. This includes both the formamide catalyst and the reactive catalyst. In addition, other known tertiary amine catalysts, organic carboxylic acid salts thereof, and organo tin compounds which are usually used as co-catalysts may be employed as auxiliary catalysts. In the process for producing polyurethane using the amine catalyst of the present invention, polyols, polyisocyanates, and foaming agents, stabilizers, and if necessary, other auxiliary agents which are hitherto known, may be employed.

The foams in the examples were made on a two component Hi-Tech RIM machine. The A and B pressures were set at 2000 psi. The A and B temperatures were held around 85 F. The throughput of the machine was set at 400 grams/second. Adjustment of the shot time was made to fill a 15 by 15 by 4-inch mold, which was pre-heated to 120 F. After filling the mold, the mold was closed and stuck back in the oven at 130 F for 5 minutes. The foam sample was removed from hot mold and crushed to open up the cells of the foam. A 15-gallon flush of the next material was made in-between the runs run to clean the lines of old material.

The B-component tank was charge with 40 pounds of a pre-mixed blend consisting of a polyol component, 43.19 pbw, which had a hydroxyl value of 33.7, water, 1.57 pbw, and 0.21 pbw of silicon surfactant B-8690, Table 1. In addition, the catalyst package consisting of a gelling and blowing catalyst was mixed into the B-component. The amount of catalysts, on a pbw basis, is shown in Table 2 for the runs.

The A-component is an isocyanate known as Rubinate® 7304 available from Huntsman International, LLC, although any isocyanate or polyisocyanate, as elsewhere described herein may be used.

TABLE 2

| | Catalysts Amounts | | | | | |
| | | | Example # | | | |
| Material, pbw | 1 | 2 | 3 | 4 | 5 | 6 |
|---|---|---|---|---|---|---|
| JEFFCAT TD-33A | 0.21 | | | | | |
| JEFFCAT ZR-50 | | 0.36 | 0.4 | | | |
| N,N-bis-(3-dimethylamino-propyl-)formamide | | | | 0.45 | 0.36 | |
| JEFFCAT ZR-50B | | | | | | 0.36 |
| JEFFCAT ZF-22 | 0.084 | 0.06 | | | | |
| JEFFCAT ZF-10 | | | 0.06 | 0.10 | 0.13 | 0.09 |

Physical properties of foams of the examples are shown in Table 3.

TABLE 3

| Physical Properties of Example 1–6 | | | | | | |
| Physical property | 1 | 2 | 3 | 4 | 5 | 6 |
|---|---|---|---|---|---|---|
| 25% | 46.3 | 50.6 | 51.7 | 52.6 | 45.0 | 43.7 |
| 65% | 136.0 | 147.1 | 143.2 | 150.2 | 133.2 | 129.7 |
| 25% return | 34.1 | 36.9 | 38.4 | 38.9 | 33.9 | 32.9 |
| sag | 2.94 | 2.91 | 2.77 | 2.85 | 2.96 | 2.97 |
| compression sets | | | | | | |
| 50% | 7.1 | 14.8 | 12.8 | 9.6 | 8.7 | 10.0 |
| 75% | 11.8 | 43.2 | 25.8 | 13.1 | 12.5 | 41.9 |
| Wet set compressions | 11.9 | 18.4 | 18.4 | 9.8 | 10.6 | 22.3 |
| Humid aged comp sets | 16.3 | 21.3 | 20.9 | 16.0 | 15.2 | 21.5 |
| CLD (avg.) | 13.3 | 14.2 | 14.5 | 15.1 | 13.8 | 12.1 |
| Density | 3.1 | 3.1 | 3.0 | 3.0 | 3.1 | 3.1 |
| Load (N) 25% | 40.5 | 43.6 | 43.9 | 46.6 | 42.2 | 35.8 |
| 40% | 54.8 | 58.0 | 58.6 | 61.6 | 56.1 | 48.2 |
| 65% | 147.4 | 148.2 | 155.1 | 158.2 | 141.9 | 124.8 |
| Stress (Pa) 25% | 3927 | 4222 | 4251 | 4517 | 4089 | 3470 |
| 40% | 5310 | 5616 | 5679 | 5969 | 5431 | 4673 |
| 65% | 14280 | 14356 | 15020 | 15321 | 13748 | 12094 |

Example 1 is the control sample. Examples 2, 3, and 6 illustrate what happens when one uses a reactive gelling catalyst. Here, the increase in 70% humid aged compression sets and in the wet set test can be seen. Examples 4 and 5 produced in accordance with the invention (which is a combination of a non-reactive gelling catalyst with a reactive blowing catalyst) yield a foam with good physical properties test results in the 75% humid aged compression sets and the wet set tests.

Consideration must be given to the fact that although this invention has been described and disclosed in relation to certain preferred embodiments, obvious equivalent modifications and alterations thereof will become apparent to one of ordinary. skill in this art upon reading and understanding this specification and the claims appended hereto.

Accordingly, the presently disclosed invention is intended to cover all such modifications and alterations, and is limited only by the scope of the claims which follow.

We claim:

1. A catalyst system useful in producing a polyurethane foam product which comprises:

a) a first catalyst defined by the structure:

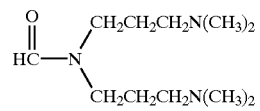

and b) a second catalyst described by the structure:

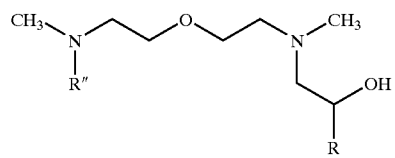

in which R is hydrogen or any alkyl group having between 1 and 10 carbon atoms, straight-chain or branched; and R" is methyl or:

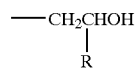

in which R is defined as above.

2. A catalyst system useful in producing a polyurethane foam product which comprises:

a) a non-reactive catalyst component defined by the structure:

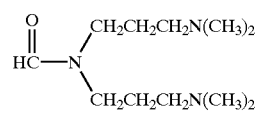

and b) a reactive catalyst component.

3. A catalyst system useful in producing a polyurethane foam product which comprises:

a) a first non-reactive catalyst component defined by the structure:

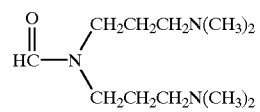

and b) a second non-reactive catalyst component.

4. A system according to claim 2 wherein N,N-bis-(3-dimethylaminopropyl) formamide is present in any amount between 10.0% and 99.9% by weight based upon the total weight of the combined amount of reactive and non-reactive catalyst components present.

5. A system according to claim 2 wherein said reactive catalyst component is present in any amount between 1.0% and 90.0% by weight based upon the total weight of the combined amount of reactive and non-reactive catalyst components present.

6. A system according to claim 2 wherein N,N-bis-(3-dimethylaminopropyl) formamide is present in any amount between 10.0% and 99.9% by weight based upon the total weight of the combined amount of catalyst components present.

7. A system according to claim 3 wherein said non-reactive catalyst component is present in any amount between 1.0% and 90.0% by weight based upon the total weight of the combined amount of reactive and non-reactive catalyst components present.

8. In the method of preparing a polyurethane foam by reacting a polyisocyanate with polyol in the presence of a blowing agent and a first catalyst to promote the reaction, the improvement consisting of conducting the reaction in the presence of a catalytic amount of a second catalyst comprising N,N-bis-(3-dimethylaminopropyl) formamide and a reactive blowing catalyst.

9. In the method of preparing a polyurethane foam by reacting an isocyanate with a polyol in the presence of a blowing agent and a first catalyst to promote the reaction, the improvement consisting of conducting the reaction in the presence of a catalytic amount of a second catalyst comprising N,N-bis-(3-dimethylaminopropyl) formamide and a non-reactive blowing catalyst.

10. The method according to claim 8 wherein N,N-bis-(3-dimethylaminopropyl) formamide is present in any amount between 0.10 and 2.00% by weight, including every hundredth percentage therebetween, based upon by weight based upon the total weight of the polyol present.

11. A method according to claim 10 wherein said reactive blowing catalyst component in the polyol is any amount between 0.001% and 1.00% by weight based upon the total weight of the polyol present.

12. The method according to claim 9 wherein N,N-bis-(3-dimethylaminopropyl) formamide is present in any amount between 0.10 and 2.00% by weight, including every hundredth percentage therebetween, based upon by weight based upon the total weight of the polyol present.

13. A method according to claim 12 wherein said non-reactive blowing catalyst component in the polyol is any amount between 0.001% and 1.00% by weight based upon the total weight of the polyol present.

14. A catalyst system useful in producing a polyurethane foam product which comprises:

a) a catalyst component defined by the structure:

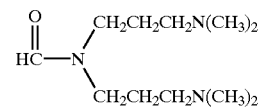

and b) 2-((2-(2-(dimethylamino)ethoxy)ethyl)methyl-amino)-ethanol.

15. A catalyst system useful in producing a polyurethane foam product which comprises:

a) a catalyst component defined by the structure:

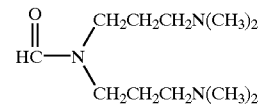

and b) any reactive blowing catalyst.

16. In the method of preparing a polyurethane foam by reacting a polyisocyanate with a polyol in the presence of a blowing agent and a first catalyst to promote the reaction comprising 2-((2-(2-(dimethylamino)ethoxy)ethyl)methyl-amino)-ethanol, the improvement consisting of conducting the reaction in the presence of a catalytic amount of second catalyst comprising N,N-bis-(3-dimethylaminopropyl) formamide.

17. In the method of preparing a polyurethane foam by reacting an isocyanate with a polyol in the presence of a blowing agent and a first catalyst to promote the reaction comprising N,N-bis-(3-dimethylaminopropyl) formamide, the improvement consisting of conducting the reaction in the presence of a catalytic amount of second catalyst comprising 2-((2-(2-(dimethylamino)ethoxy)ethyl)methyl-amino)-ethanol.

* * * * *